United States Patent [19]
Seltzer

[11] Patent Number: 5,462,295
[45] Date of Patent: Oct. 31, 1995

[54] HOMOGENEOUS INTEGRALLY MOLDED SKATE AND METHOD FOR MOLDING

[75] Inventor: Edwin Seltzer, West Chester, Pa.

[73] Assignee: Roller Derby Skate Corporation, Litchfield, Ill.

[21] Appl. No.: 191,509

[22] Filed: Feb. 4, 1994

Related U.S. Application Data

[63] Continuation-in-part of Ser. No. 998,929, Dec. 30, 1992, Pat. No. 5,326,115.

[51] Int. Cl.$^6$ .................................................. A63C 17/02
[52] U.S. Cl. ..................... 280/11.19; 280/11.27; 280/11.28
[58] Field of Search .................... 280/11.19, 11.2, 280/11.27, 11.28; 156/308.2, 308.4, 314

[56] References Cited

U.S. PATENT DOCUMENTS

| | | | |
|---|---|---|---|
| D. 245,800 | 9/1977 | Gustavsson et al. | D34/14 B |
| D. 253,670 | 12/1979 | Gustavsson et al. | D34/14 B |
| 4,262,918 | 4/1981 | Sandino | 280/11.26 |
| 4,295,655 | 10/1981 | Landay et al. | 280/11.2 |
| 4,398,735 | 8/1983 | Evans et al. | 280/11.28 |
| 4,453,727 | 6/1984 | Bourque | 280/11.12 |
| 4,651,444 | 3/1987 | Ours | 36/93 |
| 4,773,658 | 9/1988 | Bourque et al. | 280/11.12 |

*Primary Examiner*—Richard M. Camby
*Attorney, Agent, or Firm*—Sixbey, Friedman, Leedom & Ferguson

[57] ABSTRACT

A unitary, homogeneously molded boot and support for a roller or ice skate is provided as a one piece unit having no juncture between the boot and the support. The boot may be molded with either a roller skate or an ice skate chassis by forming the chassis of a first plastic having a high stiffness characteristic when cooled. The chassis is then placed in a boot injection mold and a second heated plastic is injected into contact with the chassis. The second plastic is more flexible when cooled than the first plastic, but is compatible therewith so that the two flow together and form an integral, unitary structure. The unitary boot is formed with a pivotal upper due to three slits in the boot which cooperate to provide opposite fulcrum sections about which the upper pivots.

27 Claims, 7 Drawing Sheets

HOMOGENEOUS INTEGRALLY MOLDED SKATE AND METHOD FOR MOLDING

This application is a continuation-in-part application of Ser. No. 07/998,929 filed Dec. 30, 1992 now U.S. Pat. No. 5,326,115.

BACKGROUND

The continued increase in popularity of roller skates, both quad and in-line, and ice skates has resulted in an increased demand for greater performance from the skates. To achieve greater performance from the skate, skate designers and manufacturers continue to search for designs and manufacturing techniques to improve the handling, maneuverability, support, and durability the skate can offer the user.

Conventionally, prior art skates have been manufactured by first fabricating a shoe or boot to secure to the foot of the user, and secondly by attaching wheels or blades to the shoe or boot through the use of a truck assembly or blade mount. The truck assembly or blade mount is normally attached to the shoe or boot using screws, bolts, rivets or another similar form of fastener. For example, U.S. Pat. No. 4,262,918 issued to Sandino discloses a roller skate chassis including a foot plate unitarily molded with wheel trucks and wheel axle mounts. The footplate is then attached to a shoe member by threaded screws or rivets. A similar rivet attached blade support for an ice skate is shown by U.S. Pat. No. 4,453,727 to Bourque. As a result of this two piece construction, the large amount of internal stresses developed in the skate during use are concentrated at the junction between the shoe member or boot and the foot plate or truck assembly. This concentration of stress can lead to gradual separation of the boot from the plate resulting in excessive play or movement between the parts reducing the handling and maneuverability of the skate. Also, the fasteners may fail or rupture causing complete separation and possible injury to the user. Most importantly, because of the practical inability of fasteners to adequately join two separate, non-homogenous parts together as a single integral unit, the lines of force transmitted through the boot during use are not sufficiently distributed throughout the skate to maximize the handling and maneuverability characteristics of the particular skate. Lastly, the manufacturing of the skate disclosed in the Sandino patent necessarily includes a separate additional step of attaching the shoe member to the foot plate.

U.S. Pat. No. 4,295,655 issued to Landay et al. discloses a roller skate including an upper boot adhesively bonded by injection molding to a beam sole or foot plate to which is attached wheel hanger structures. In this design, the internal stress in the skate will be concentrated at the junction between the beam sole and the hanger structures because of the inability of these connections to evenly distribute the lines of force created in the skate. The adhesive connection between the upper boot and the beam sole will be more apt to provide an even force distribution throughout the skate than a connection formed by other fastening techniques. However, since the upper boot is constructed of a different material than the beam sole, the connection is not as effective as a homogeneous, integrally molded junction in distributing forces while minimizing junction stresses. Moreover, the manufacturing process of the skate disclosed in Landay et al. would necessarily involve the steps of attaching both the upper boot and the hanger structures to the beam sole.

The handling and maneuverability of wheeled devices has been improved by the use of a truck assembly having a deflection beam extending at an angle from an upper support plate to form an axle hub for supporting the wheels. As disclosed in U.S. Pat. No. 4,398,735 to Evans et al., the deflection beam, combined with an impact post for creating a pivot point for rotation of the axle hub, provides a very stable support system with minimal wobble at high speeds and a high degree of maneuverability. However, since the deflection beam is fastened to an upper board, a high concentration of stress will be developed in the junction between the beam and the board causing an uneven distribution of forces in the truck assembly. Also, pivoted lateral movement of a user's foot, ankle and leg is not effectively transmitted to the truck assembly since no shoe or boot is attached to the upper board. Consequently, the maneuverability and handling potential of the skate is not maximized and the benefits obtained by the deflection bean can not be fully appreciated.

The molded boots used for quad roller skates, in-line roller skates and ice skates could be similar or identical in construction, and yet a number of manufacturing steps are required to separately mold the boot, separately mold the skate chassis or blade holder and to then secure all of the separate parts together in the proper relationship. Most molded boots are provided with a separate pivoted cuff which adds to the number of parts which must be assembled.

SUMMARY OF THE INVENTION

It is one object of the present invention to provide an improved unitary molded boot skate and chassis which can provide stable support for a user's foot while offering increased handling, maneuverability and durability.

Another object of the present invention is to provide a novel and improved skate boot and chassis which can be simply and efficiently manufactured as a single, homogeneous, integrally molded piece thereby simplifying the manufacturing process by minimizing the number of assembly steps.

Yet another object of the present invention is to provide a novel and improved unitary skate chassis or frame and boot for a quad roller skate, an in-line roller skate or an ice skate which effectively and evenly distributes internal stresses developed during use to provide improved skating performance and skate durability.

A further object of the present invention is to provide a novel and improved ice or quad and in-line roller skate which more effectively directs and focuses the steering forces created in the skate by the user during maneuvering to provide better control and handling through a broader range of maneuvers.

Yet another object of the present invention is to provide a novel and improved unitary molded skate boot and chassis wherein the boot is designed with a system of slits in the heel and ankle area to provide for flexure in a completely unitary boot unit.

A still further object of the present invention is to provide a novel and improved method for interchangeably molding a unitary boot and roller skate or ice skate chassis in a single mold.

These and other objects of the present invention are achieved by forming a single, homogeneous skate having an integrally molded upper boot and a truck assembly. The upper boot includes a base portion and side walls extending from one side of the base portion to provide lateral support to the user's foot and ankle while the truck assembly extends from a second side of the base portion to provide an attachment means for attaching wheels or an ice skate blade. The truck assembly may include a deflection beam for a quad skate extending at an acute angle from the second side of the base portion to form an axle hub. The truck assembly may also include an impact post for each axle hub extending substantially perpendicular from the base portion adjacent the axle hub to provide both vertical support and a pivot point for the axle hub. A brake mount may also be integrally formed on the truck assembly.

For an in-line, quad or ice skate, a wheel supporting truck or ice skate blade holder molded of plastic may be interchangeably placed in the bottom of a mold for a skate boot, and then the boot is molded over the truck or blade holder from a compatible plastic to form a unitary molded unit.

BEST MODE FOR CARRYING OUT THE INVENTION

Throughout this specification, the words "downward" and "downwardly", "upward" and "upwardly" will correspond to the directions, respectively, toward and away from the surface on which the roller or ice skate is placed in the normal upright position. The words "lower" and "upper" will refer to the portions of the skate chassis which are, respectively, closest to and farthest away from the surface on which the skate rests when placed in the normal upright position.

Figure 1:
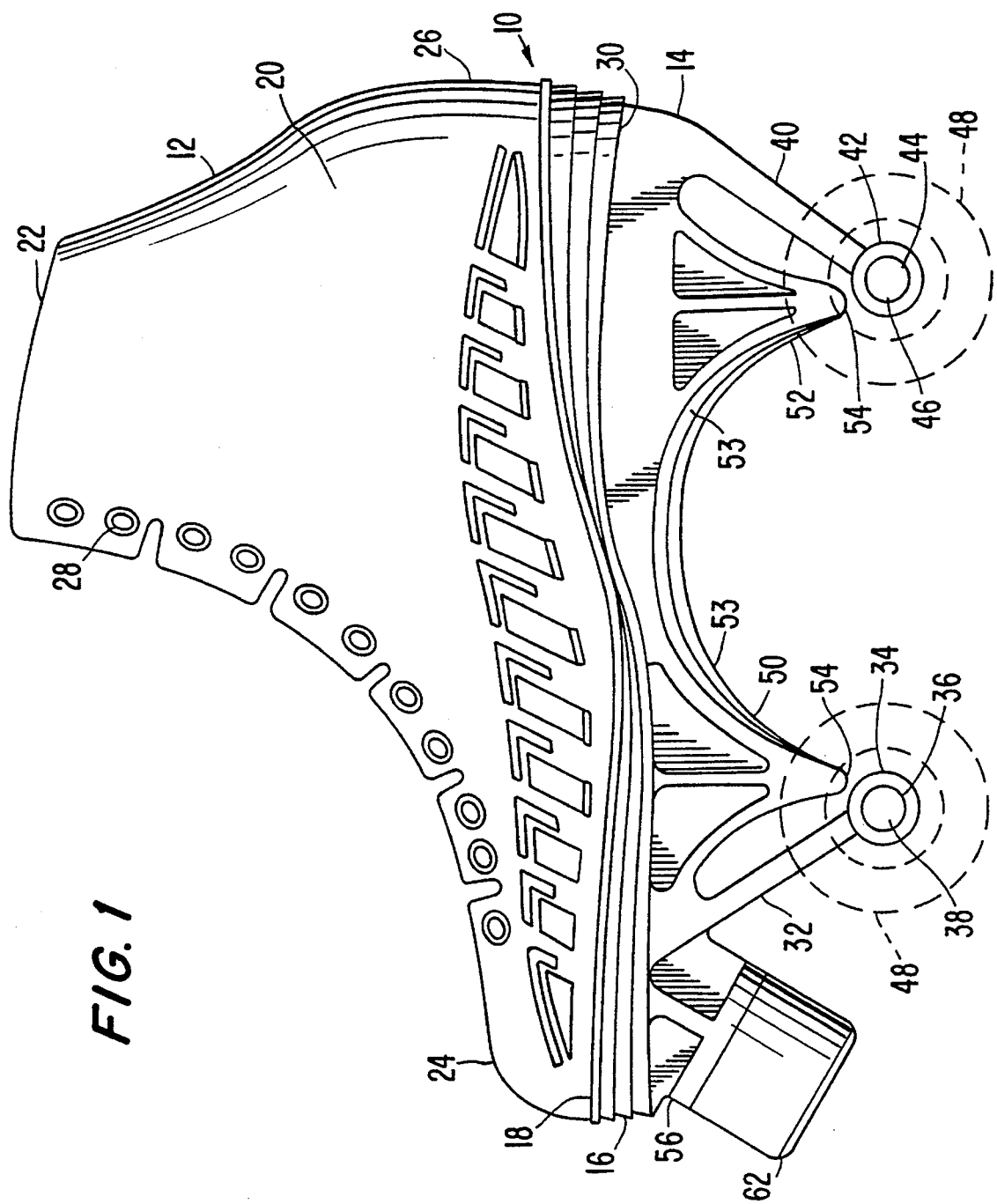
FIG. 1 is a side elevation of a skate in accordance with the present invention.

Referring to FIG. 1, the novel quad roller skate of the present invention indicated generally at 10 includes an upper boot 12 and a truck or frame assembly 14. Upper boot 12 and truck assembly 14 are molded as a single, homogeneous, integral piece to form skate 10. Therefore, in practical form, upper boot 12 and truck assembly 14 are not distinct separate parts connected together by some form of fastener but are identifiable portions of the single, homogeneous integrally molded skate of the present invention. Since the skate is subjected to a variety of forces and stresses during skating, the material used to form skate 10 should be a high impact resistant plastic commonly used in the formation of roller or ice skates, such as a nylon material, polypropylene, various polypropylene elastomers and thermoplastic urethane. These materials provide the durability and resiliency necessary for the effective performance of the skate. Also, these materials allow the skate to be manufactured using injection molding.

Figure 2:
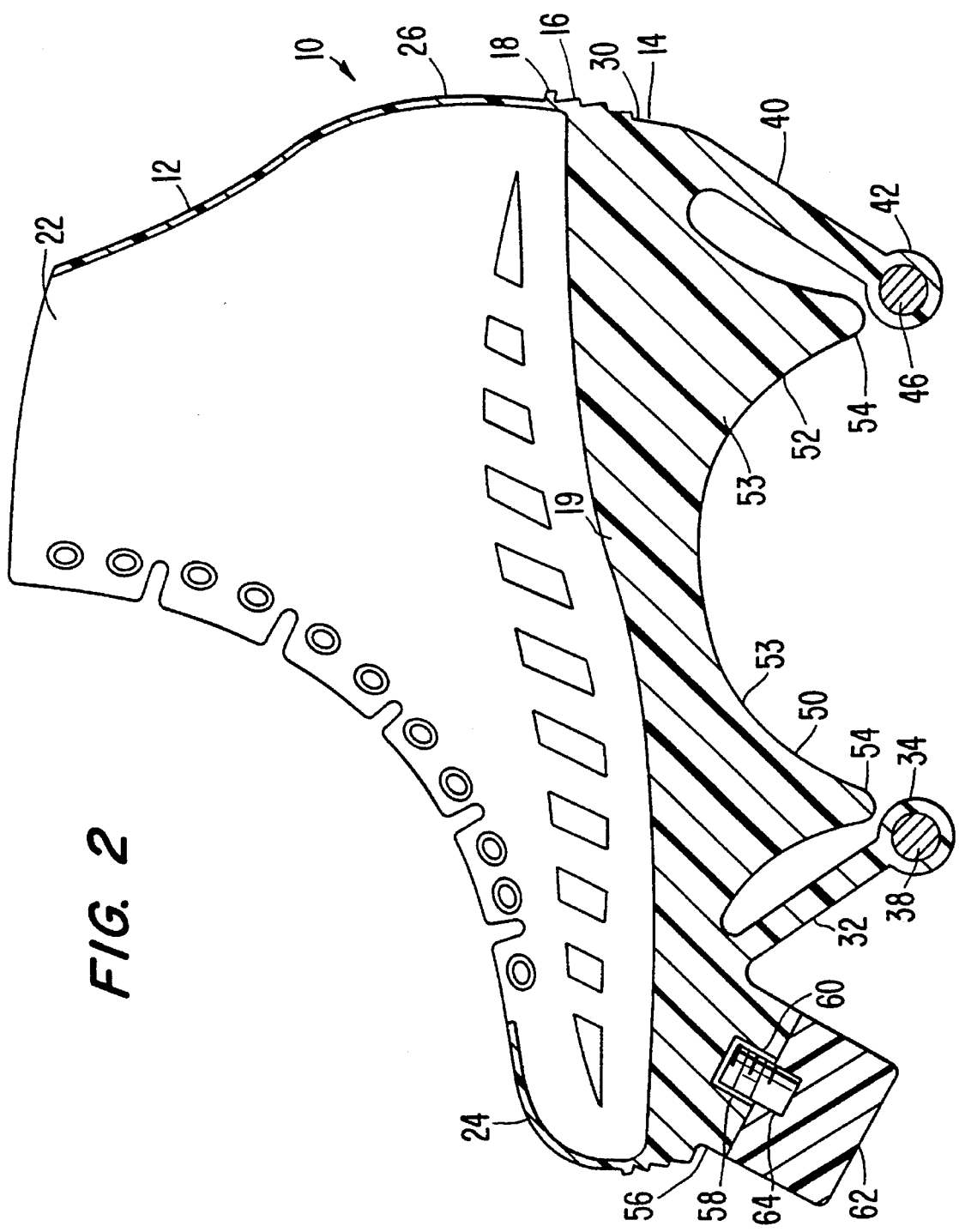
FIG. 2 is a side cross sectional view of the skate of the skate chassis of FIG. 1 taken along line 2—2 in FIG. 3.

As shown in FIGS. 1 and 2, upper boot 12 includes a base portion 16 having a generally flat, horizontal top side or surface 18 with an outer peripheral shape corresponding to the shape of a user's foot. Since base portion 16 provides vertical support for the user's foot, top side 18 may be shaped to conform to the bottom surface of the user's foot, such as the arch area 19.

Upper boot 12 includes side wall portions 20 which extend upwardly from top side 18 of base portion 16. Side wall portions 20 form a cavity 22 for receiving a user's foot. A liner or sock may be attached to the interior of cavity 22 to allow side wall portions 20 to securely support the user's foot while providing a cushioning effect. Upper boot 12 also includes a toe portion 24 positioned at one end of base portion 16 and a heel portion 26 formed at an opposite end of base portion 16. Toe portion 24 and heel portion 26 are spaced longitudinally along base portion 16 an appropriate distance corresponding to the length of a particular user's foot so as to snugly, but comfortably, received the user's foot in cavity 22. A plurality of apertures 28 may be formed inside wall portions 20 for receiving boot or shoe laces (not shown) to secure a user's foot in cavity 22. Alternatively, any other commonly used fastener for securing a person's foot in a shoe or boot could be employed.

Truck assembly 14 includes and extends downwardly from the top side surface 18 of base portion 16. Truck assembly 14 includes a forward beam 32 extending downwardly at an acute angle from bottom side 30 toward the rear of skate 10. An axle hub 34 is integrally formed on the lower end of forward beam 32, and this axle hub includes a center bore 36 extending transversely therethrough for attaching an axle 38 to forward beam 32. Also, a rear beam 40 extends downwardly from bottom side 30 opposite heel portion 26 toward forward beam 32 at an acute angle from base portion 16. Similarly, an axle hub 42 having a center bore 44 is integrally formed on the lower end of rear beam 40. Both center bores 36, 44 are sized to receive axles 38, 46, respectively, which extend transversely outward from axle hubs 34, 42 on both sides of chassis 10 to receive wheels 48. Therefore, one wheel is rotatably connected on each side of each axle hub 34 and 42 using axles 38 and 46, respectively, as oriented on a conventional quad roller skate.

Figure 3:
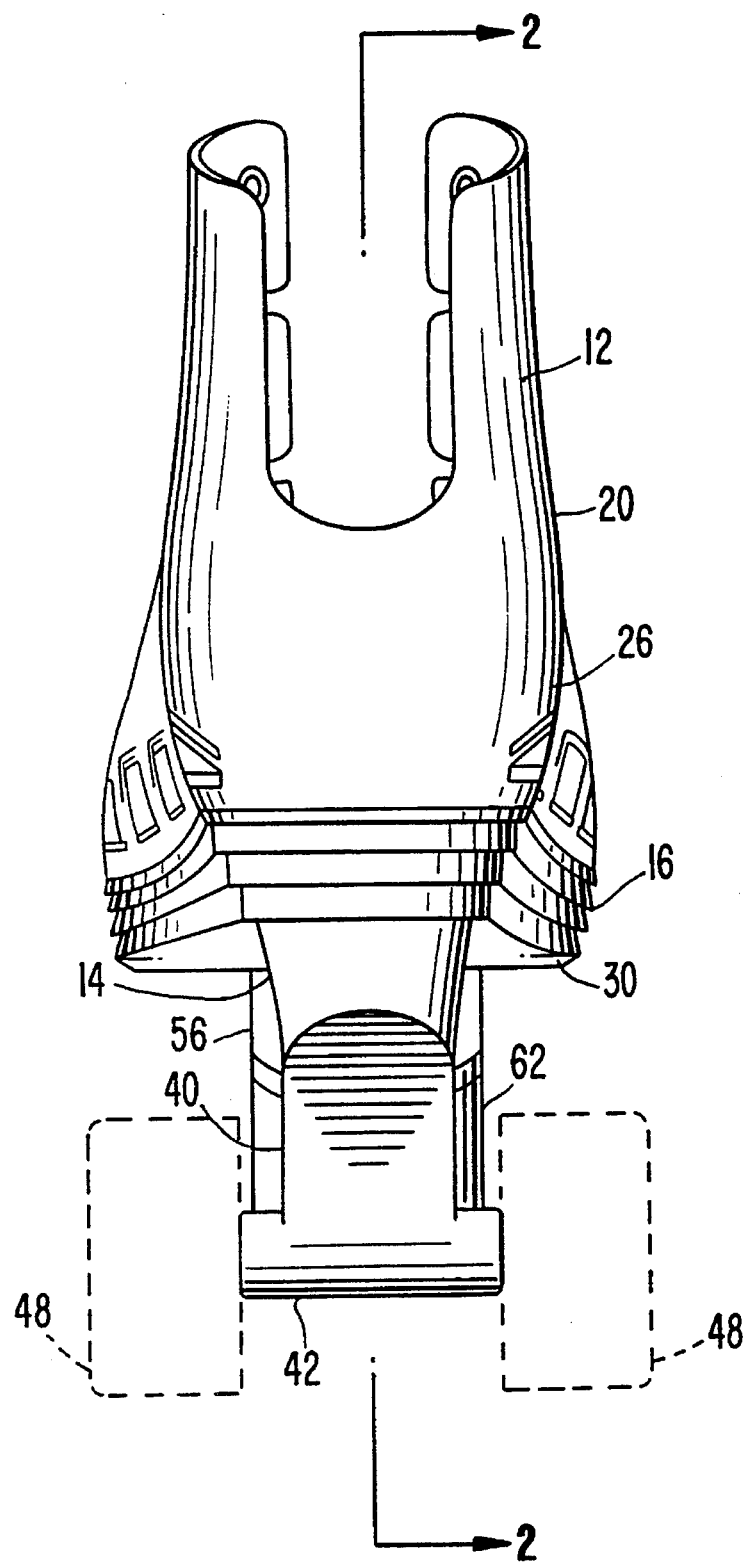
FIG. 3 is a rear elevation of the skate shown in FIG. 1.

Both forward beam 32 and rear beam 40 are generally rectangular in shape. As contrasted in FIGS. 1 and 3, the transverse width of beams 32, 40 is substantially greater than the thickness thereof. These dimensions allow beams 32, 40 to deflect upwardly toward base portion 16 and to twist or rotate, as further described herein below.

Truck assembly 14 also includes a forward impact post 50 and a rear impact post 52 integrally formed with upper boot 12. Forward impact post 50 extends downwardly from bottom side 30 toward axle hub 34. Similarly, rear impact post 52 extends downwardly from bottom side 30 of base portion 16 toward axle hub 42. As shown in FIGS. 1 and 2, forward impact post 50 and rear impact post 52 include a long, upper base portion 53 integrally formed with base portion 16 of upper boot 12 and a shorter lower end 54 terminating at a spaced distance from axle hubs 34, 42. Upper base portions 53 are longer, relative to the longitudinal axis of base portion 16, than lower ends 54 to provide substantial support for lower ends 54 and, in turn, beams 32, 40 during use. Forward impact post 50 and rear impact post 52 generally extend from the central longitudinal axis of the skate 10 thereby evenly distributing the weight of the user to each of the four wheels 48, as can be appreciated from FIG. 3.

A brake mount 56 may also be integrally formed with the skate 10. As shown in FIGS. 1 and 2, brake mount 56 is positioned forward of forward beam 32 and extends downwardly from bottom side 30 opposite toe portion 24. Brake mount 56 includes a recess 58 for securely receiving a threaded insert 60. In this manner, a toe stop 62, having a threaded stud 64, can be securely attached to brake mount 56 by screwing stud 64 into insert 60.

During use, forward beam 32 and rear beam 40 deflect inwardly toward bottom side 30 into abutment with forward impact post 50 and rear impact post 52, respectively. Impact posts 50, 52 both function to prevent beams 32, 40 from deflecting by an amount which would cause the beam material to lose its structural integrity. In addition, lower ends 54 of impact posts 50, 52 provide surfaces for supporting the torsional rotation of beams 32, 40. Therefore, when the user leans on one side of base portion 16, in an effort to turn during skating, a force is applied to the wheels on that particular side of the skate causing axle hubs 34, 42 to rotate transversely around lower ends 54 thereby causing the torsional rotation of beams 32, 40 thereby assisting the skater in completing the turn. The ability of beams 32, 40 to flex or torsionally rotate is related to the force necessary to turn during skating. The more resistant beams 32, 40 are to rotation, the greater the force required to turn during skating. One manner of controlling the turning ability of the skate by varying the torsional resistance of the beams 32, 40 is to vary the thickness of beams 32, 40. Increasing the thickness of beams 32, 40 will result in more resistance to torsional rotation requiring the same user to apply a greater force to turn. Alternatively, lower ends 54 and be shaped to vary the contact surface area thereby varying the resistance of the rotation of beams 32, 40.

As best shown in FIG. 2, upper boot 12 and truck assembly 14, including brake mount 56, forward beam 32, rear beam 40, impact posts 50, 52 and axle hubs 34, 42, are all integrally molded into a single homogeneous skate 10. During use, with the roller skate securely attached to a user's foot, a variety of forces are imparted to the skate by both the user's body weight and the pushing and twisting loads applied by the user during skating and turning. In the conventional skate where two or more parts are fastened together to form the skate, these forces become unevenly distributed at the junction between the connected parts. This uneven distribution of forces impairs the handling and maneuverability of the skate.

Also, the forces imparted to the skate create internal stresses and in the conventional roller skate, these internal stresses are concentrated at the junction between the connected parts. This concentration of stress may cause the fasteners to fail or rupture resulting in the complete separation of the parts and possible injury to the user. Also, this uneven distribution of internal stresses can lead to the gradual separation of the boot from the conventional base plate positioned between the boot and the truck assembly resulting in excessive play or movement between the parts reducing the handling and maneuverability of the skate.

The roller skate of the present invention overcomes these disadvantages by using a single, homogeneous, integrally molded, skate. By molding the upper boot 12 and truck assembly 14 into a single homogeneous skate 10, the forces and internal stresses developed during use are more evenly distributed throughout the skate to provide improved handling, maneuverability and durability throughout the life of the roller skate. Since the integrally molded, homogenous skate 10 avoids the need for a separate base plate and includes no junctures where two parts are connected, the internal stresses do not become concentrated in such juncture areas and, therefore, are more evenly distributed throughout skate 10 avoiding the disadvantageous discussed above. For example, any lateral force applied to side wall portions 20 will be transmitted directly to truck assembly 14 without becoming unduly concentrated at one particular location. The integrally molded, homogenous nature of the skate 10 causes the turning forces developed during skating to be more effectively transmitted to beams 32, 40 and axle hubs 34, 42. In this manner, the improved force distribution qualities of the integrally molded, homogenous skate 10 enhances the maneuverability qualities of the deflection beams 32, 40 to improve the overall handling and durability of the roller skate. In addition, since the skate 10 is a one-piece member, it contains no parts which require adjustment or readjustment throughout the usable life of the skate. Also, the one-piece integrally molded skate reduces the number of parts required to complete the roller skate and, therefore, minimizes the number of assembly steps, time and labor required to assemble the roller skate.

Referring now to FIGS. 4–9, there is disclosed a novel method in accordance with the present invention for injection molding a unitary skate construction including a boot and either an ice skate chassis or an in-line or quad skate frame in a single injection mold. Due to the cost of injection molds, it is economically advantageous to have the ability to mold different types of skates in the same mold. At the same time, it is in many cases advantageous to mold the skate chassis or framework from a plastic which is much stiffer than the plastic used for the molding of the skate boot so that a boot having much greater flexibility is achieved. When both the boot and the skate chassis or frame are molded from a single plastic, it is often difficult to achieve rigidity in the chassis or frame while molding the sides of the boot to a thickness which will permit sufficient flexibility. To accomplish this, a relatively complex mold is required to produce a boot wall which is sufficiently thin in areas where flexibility is required to provide such flexibility.

In accordance with the present invention, it has been found that the boot and skate frame or chassis can be molded as a single, integral homogeneous unit and at the same time, plastics having different flexibility characteristics can be employed. To accomplish this, it is important that plastics used for the boot and the skate chassis or frame are compatible and will flow together when heated. It has been found desirable to use plastics of the same plastic family which have different stiffness characteristics. For example, different polypropylene elastomers may be used to form the skate boot and the skate chassis or frame, with the stiffer polypropylene elastomer being used for the chassis or frame. Similarly, two different thermoplastic urethanes may be used in the same manner. Conversely, plastics having entirely different characteristics, such as a polyvinyl chloride and a nylon, cannot be effectively used to mold a unitary, homogeneous boot and skate chassis or frame.

Figure 4:
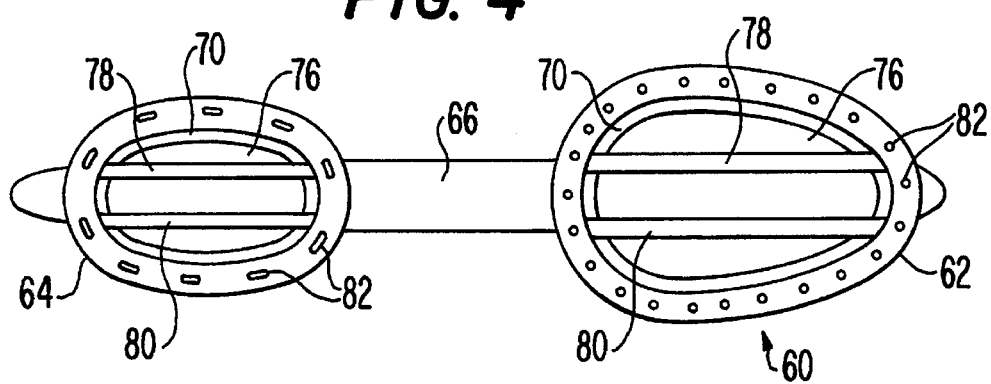
FIG. 4 is a plan view of an molded ice skate chassis for use with the present invention.
Figure 5:
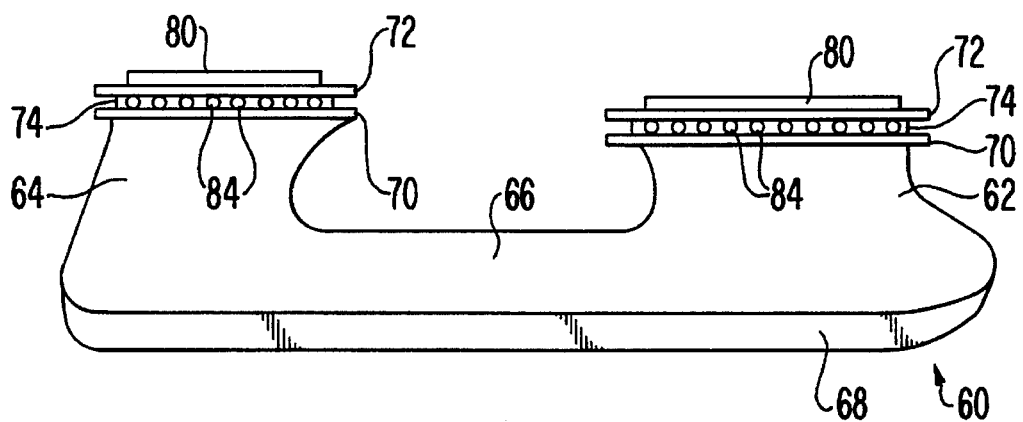
FIG. 5 is a view in side elevation of the ice skate chassis of FIG. 4.

Referring now to FIGS. 4–5, an ice skate chassis 60 is illustrated having a forward pedestal 62 and a rear pedestal 64 which joins the ice skate chassis to a molded boot. The pedestals 62 and 64 are bridged by a cross beam 66 which supports a metal skate blade 68.

The upper extremities of the forward and rear pedestals 62 and 64 may be of different sizes to accommodate attachment to the toe and heel portions of a skate boot, but structurally these upper extremities are identical and consequently like structural elements will be identified by the same reference numeral. The upper extremity of each pedestal is formed with a first flange 70 and a second flange 72 which is substantially equal in size to the first flange and which is spaced above the first flange by a joinder wall 74. As will be noted in FIG. 4, the flanges 70 and 72 and the joinder walls 74 define an opening 76 at the top of the forward and rear pedestals 62 and 64, with the flanges and joinder walls while being annular to the opening. The opening 76 is divided into sections by spaced divider walls 78 and 80 which extend across the opening 76.

The second flange 72 is provided with spaced holes 82 extending through the flange, while the joinder wall 74 is provided with spaced holes 84 extending through the wall into the opening 76. The entire ice skate chassis 60, with the exception of the metal blade 68, is a unitary molded unit formed from a relatively stiff plastic material.

Figure 6:
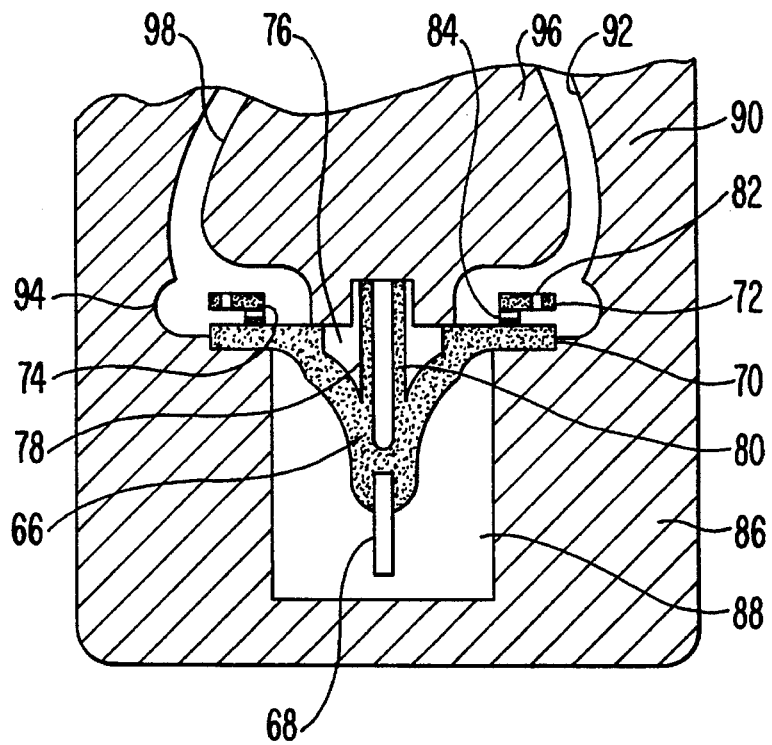
FIG. 6 is a sectional view of the ice skate chassis of FIG. 4 positioned in an injection mold.
Figure 7:
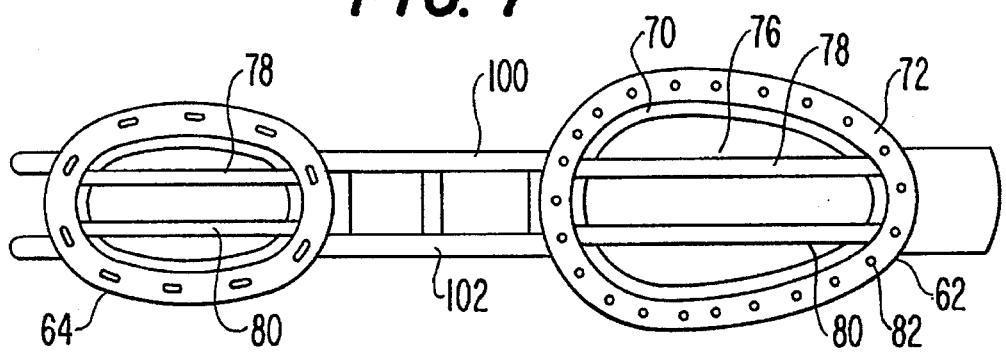
FIG. 7 is a plan view of a molded in-line roller skate chassis for use with the present invention.
Figure 8:
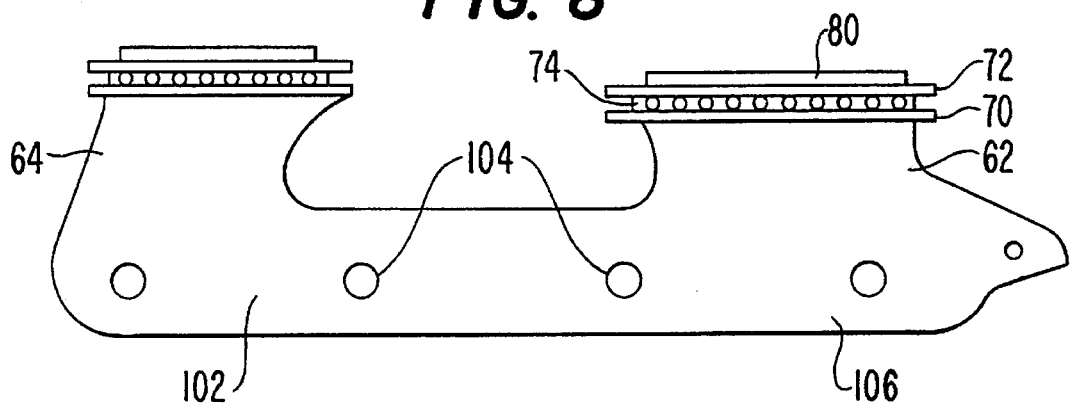
FIG. 8 is a view in side elevation of the in-line roller skate chassis of FIG. 7.

In accordance with the present invention, the ice skate chassis 60 is first molded, and is then placed in a specially formed injection mold 86 as shown in FIG. 6. The mold 86 is provided with a longitudinally extending chamber 88 which is configured to receive the cross beam 66 and blade 68 and which is closed by the flange 70 in the area of the flange. The mold includes an outer section 90 having an internal surface 92 which is configured to shape the outer surface of a molded boot. Only the portion of the mold which forms the lower section of the boot is shown in FIG. 6. In the area of the first flange 70, the outer section 90 of the mold is curved at 94 to engage the flange 70 and form the sole of the boot. It will be noted that the second flange 72 and the joinder wall 74 extend into this sole portion of the mold. This sole portion extends around the periphery of the first flange 70 so that ultimately this first flange will be embedded in the plastic of the sole portion of the boot.

The interior of the boot is formed by an interior mold section 96 having a curved wall 98 which is spaced from the wall 92 to form the exterior wall of the boot. Between the flanges 70 of the forward and rear pedestals 62 and 64, the upper portion of the longitudinally extending chamber 88 is closed by a removable interior portion of the mold member, not shown, which defines the lower surface of the boot sole in this area.

To facilitate removal of the molded skates, the various portions of the injection mold 86 may be formed in sections in known manner. The ice skate chassis 60 is placed within the injection mold, and the sections of the mold are then assembled around the chassis. Hot plastic which is compatible with the plastic used to form the ice skate chassis is then injected into the mold to form the skate boot, and this plastic surrounds the first flange 70 and the second flange 72 and flows through the openings 82 and 84 and fills the space between the flanges. Since the plastic used to form the boot is of the same family as the plastic used to form the ice skate chassis, some melting of the ice skate chassis occurs and the two plastics flow together to form a unitary homogenous unit. Thus, when the mold is removed, the resultant ice skate is a single, one piece plastic unit wherein the second flange 72 flows into the sole portion of the boot due to the flow of heated plastic through the openings 82 and 84. Rigidity of the ice skate chassis may be maximized, while the boot is formed to have much greater flexibility without requiring the side walls of the boot to be carefully configured to achieve such flexibility.

Figure 9:
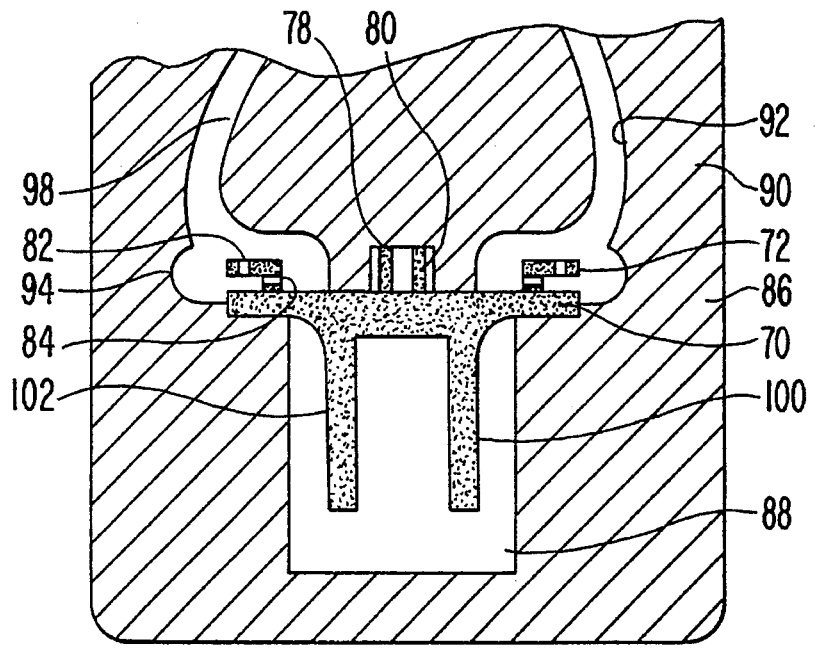
FIG. 9 is a sectional view of the in-line roller skate chassis of FIG. 7 positioned in the injection mold of FIG. 6.
Figure 10:
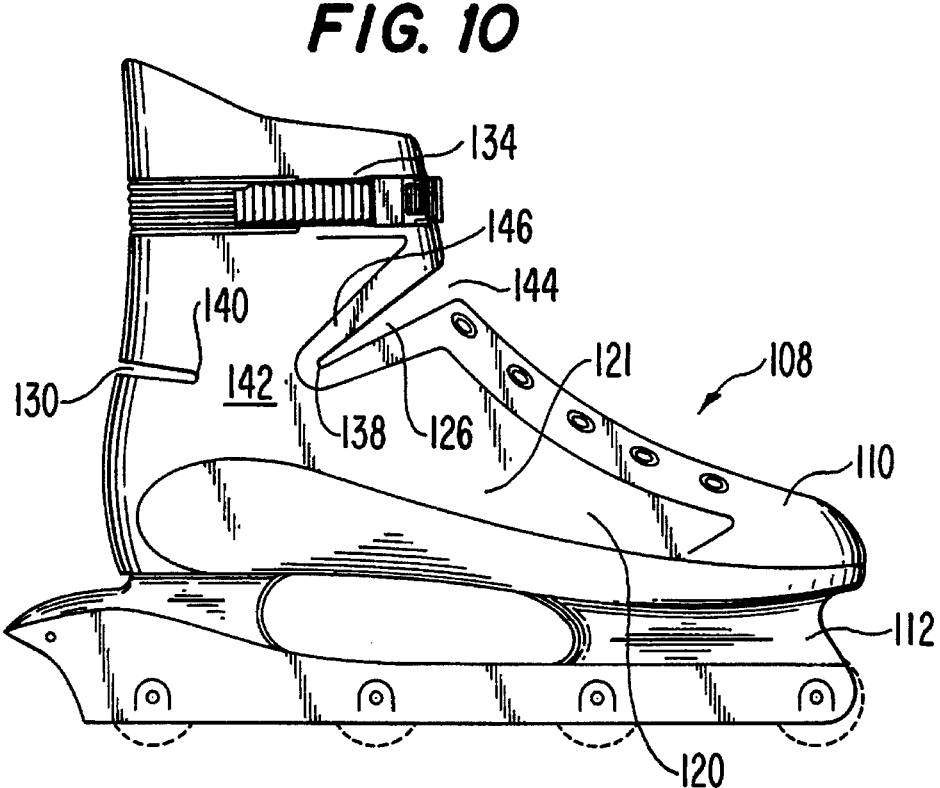
FIG. 10 is a left side elevational view of an integral in-line skate boot and skate frame of the present invention.
Figure 11:
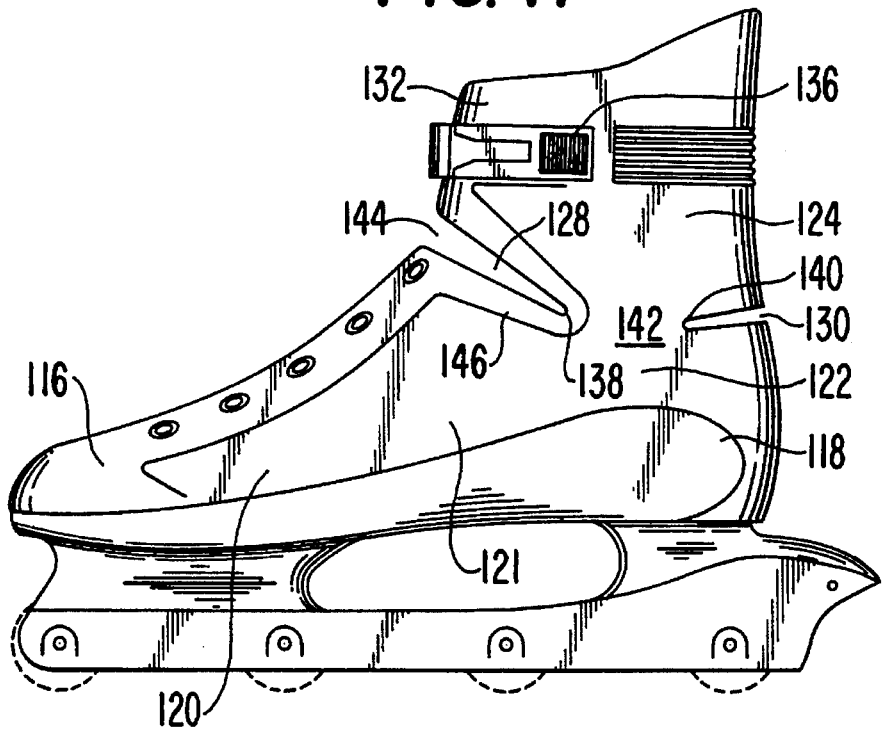
FIG. 11 is a right side elevational view of the integral in-line skate boot and frame of FIG. 10.
Figure 12:
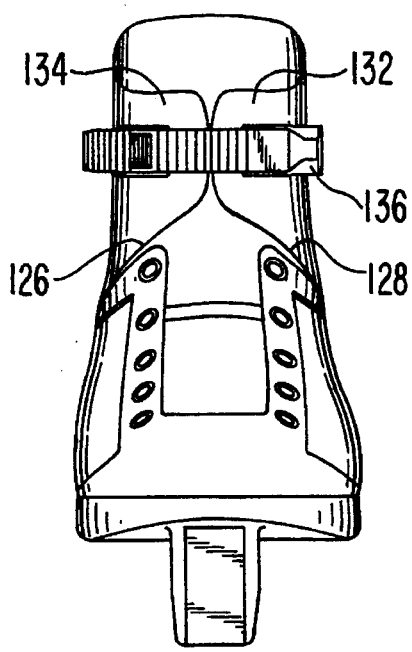
FIG. 12 is a front elevational view of the integral in-line skate boot and frame of FIG. 10.
Figure 13:
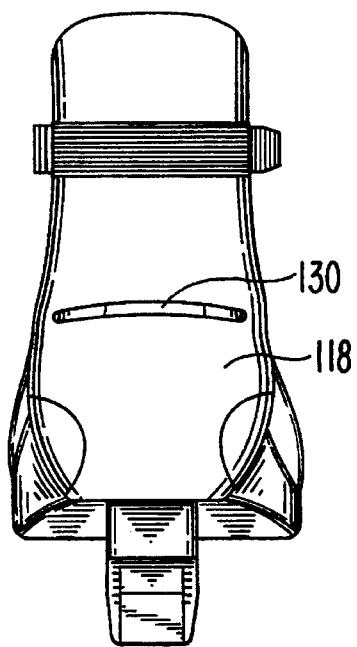
FIG. 13 is a rear elevational view of the integral in-line skate boot and frame of FIG. 10.
Figure 14:
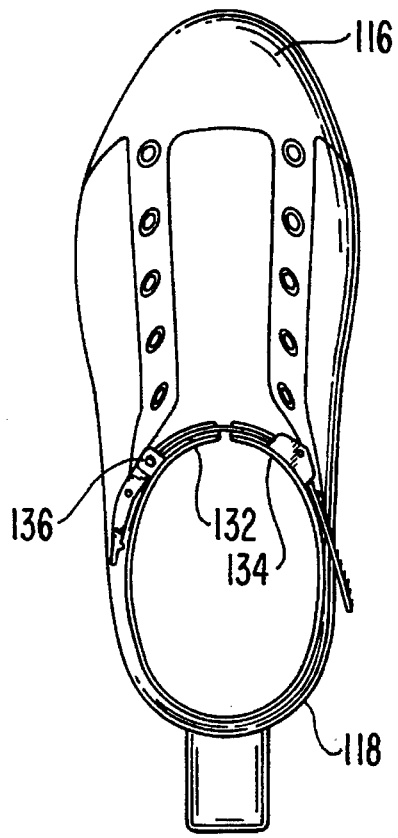
FIG. 14 is a top plan view of the integral in-line skate boot and frame of FIG. 10.
Figure 15:
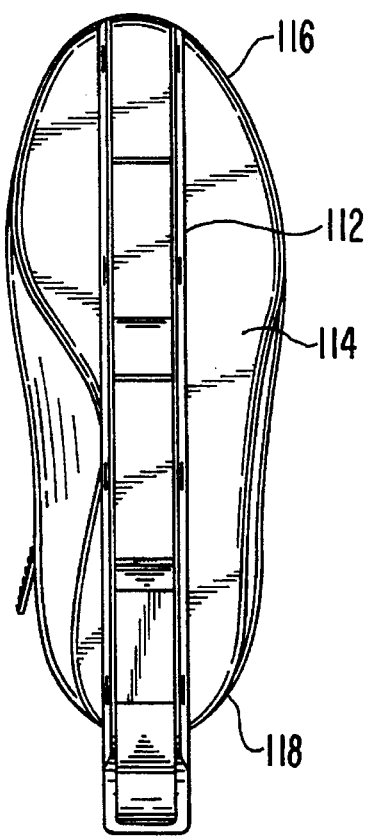
FIG. 15 is a bottom plan view of the integral in-line skate boot and frame of FIG. 10.

In accordance with the present invention, the injection mold 86 of FIG. 6 may be used to form a unitary, homogeneously molded skate unit for skates of different types. As an example, referring to FIGS. 7–9, the injection mold 86 can be used to alternatively form an in-line skate and, in the same manner, could be used to form a quad skate. To accomplish this, each skate formed in the mold includes a forward pedestal 62 and a rear pedestal 64 which is identical in size and configuration to those shown in FIG. 5. Only the skate frame below the pedestals differ, and as will be noted from FIGS. 7–9, for an in-line skate this skate frame includes spaced side bars 100 and 102 having apertures 104 extending therethrough to receive the axles of the wheels for an in-line skate. Thus, a unitary molded in-line skate frame 106 is formed which fits within the longitudinally extending chamber 88 on the injection mold 86 as shown in FIG. 9. A boot may be integrally and homogeneously molded to this in-line skate frame in the same manner as described in connection with the ice skate chassis 60 of FIG. 6.

Referring now to FIGS. 10–15, there is illustrated a unitary, homogeneously molded in-line skate indicated generally at 108 wherein the skate boot 110 and the frame 112 for the skate wheels are molded in accordance with the present invention to form a single one piece molded plastic skate.

The boot 110 has a sole 114 from which the frame 112 extends. As is conventional with molded in-line skate boots, the boot 110 includes a toe portion 116, a heel portion 118, and opposed sidewalls 120 with a midfoot portion 121 which join the toe portion to the heel portion. The boot also includes an ankle portion 122 positioned in the area of the ankle of a boot wearer spaced forwardly of the heel portion 118, and a boot upper 124 extends above the ankle portion. In conventional in-line skate boots, the boot upper is normally formed by a separate cuff which is pivoted to the ankle portion of the boot so that the boot upper can move forwardly and rearwardly above the pivot point during a skating motion. In the unitary molded boot 110, this separate pivoted cuff is eliminated, and is replaced by three slits or slots 126, 128 and 130 extending through the boot. The slit 130 is an arcuate slit formed to run completely around the back surface of the boot and along opposed side surfaces thereof. This slit extends completely through the wall of the boot at a point where the boot upper 124 joins the ankle section 122. Above the slit 130, in the front of the boot, the boot upper forms two flaps 132 and 134 which are drawn together by a suitable strap and latching assembly 136 of any suitable known type commonly used to latch skate boots, ice skate boots, and roller skate boots. The lower edges of the flaps 132 and 134 are defined by the slits 126 and 128 which are of triangular, pie shaped configuration and which incline rearwardly and downwardly on either side of the boot from the front thereof at a point spaced below the strap and latch assembly 136. Each of the triangular, pie shaped slits 126 and 128 is widest at the front of the boot and inclines downwardly toward an apex point 138 which is slightly above but spaced from the ends 140 of the slit 130. The slit 130 with the slits 126 and 128 define a fulcrum section 142 on opposite sides of the skate between the apex 138 for the slits 126 and 128 and the ends 140 of the slit 130. To permit the upper 124 to pivot easily about the fulcrum section 142, the distance between the apices 138 and the ends 140 of the slit 130 should be no more than one half of the distance across one side of the upper 124, and usually this distance is less than one half this distance.

Since, during the skating action, it is important for the upper 124 to have the capability of flexing forwardly about the fulcrum section 142, the open ends 144 of the slits 126 and 128 are wider than the width of the slit 130. Also, to enhance this forward flexture, the thickness of the walls of the boot upper progressively decrease from the ends 140 of the slit 130 to the apices 138 of the slits 126 and 128. Thus, the rear portions of the through which the slit 130 extends are much stiffer than are the portions of the upper bordering the slits 126 and 128. To prevent tearing or cracking of the plastic boot at the apices 138, the wall of the boot adjacent the edges of the slits 126 and 128 may be slightly thickened to provide a reinforcing border 146.

I claim:

1. A plastic skate molded as a single, homogenous, integrally molded piece from compatible plastics having different flexibility characteristics comprising:

a boot portion for receiving a skater's foot having a molded plastic outer shell including a toe portion, a heel portion spaced from said toe portion, first and second opposed sidewall portions extending longitudinally from said toe to said heel portion, and a base portion extending between said sidewall portions and said heel and toe portions, said base portion including a bottom side and a top side surface which forms the bottom foot support for said skater's foot and which with said heel, toe and sidewall portions defines a cavity within said molded outer shell for receiving a skater's foot which is supported and enclosed thereby, said outer shell being formed of a first thermoplastic elastomer and a support structure molded integrally with said base portion and extending from the bottom side of said base portion, said support structure being formed of a second thermoplastic elastomer which is different from said first elastomer, said second elastomer, when cooled, being more rigid and less flexible than said first elastomer when cooled, said boot portion and support structure being formed as a single unitary piece with no junctures therebetween and no separable moving parts.

2. The plastic skate of claim 1 wherein said molded outer shell heel, toe and sidewall portions are molded to have a reduced, thin cross sectional area relative to the cross sectional area of said support structure, and said top side surface of said base portion includes an arch area and is curved to substantially conform to the bottom of a user's foot.

3. The plastic skate of claim 1 wherein said support structure includes wheel attachment means molded integrally with said base portion, said wheel attachment means extending outwardly from the bottom side of said base portion and including a plurality of longitudinally spaced axle mounting means for receiving skate wheel axles.

4. The plastic skate of claim 1 wherein said support structure includes ice skate blade mounting means for mounting an ice skate blade molded integrally with said base portion, said ice skate blade mounting means extending outwardly from the bottom side of said base portion.

5. The plastic skate of claim 2 wherein said first and second elastomers are different elastomers of the same plastic.

6. The plastic skate of claim 5 wherein said first and second elastomers are polypropylene elastomers.

7. The plastic skate of claim 5 wherein said first and second elastomers are thermoplastic urethanes.

8. The plastic skate of claim 1 wherein said support structure is a unitary, molded structure and includes at least first and second spaced attachment pedestals and a cross beam assembly extending between and integrally molded with said first and second pedestals, said first and second pedestals each including an attachment end spaced from said cross beam assembly, the attachment ends of said first and second pedestals being embedded in and molded into said base portion of the molded outer shell.

9. The plastic skate of claim 8 wherein the attachment ends of said first and second pedestals include flow through holes within which are molded the first thermoplastic elastomer forming said base portion.

10. The plastic skate of claim 8 wherein the attachment ends of the first and second pedestals are formed with a flange embedded in said base portion.

11. The plastic skate of claim 10 wherein each said flange is formed with flow through holes within which are molded the first thermoplastic elastomer forming said base portion.

12. The plastic skate of claim 8 wherein said cross beam assembly includes two, spaced, substantially parallel side bars having aligned apertures formed therein to receive axles of wheels for an in line skate.

13. The plastic skate of claim 12 wherein the attachment end of said first pedestal is molded into said base portion adjacent to the toe portion of said outer shell and the attachment end of said second pedestal is molded into said base portion adjacent to the heel portion of said outer shell.

14. The plastic skate of claim 13 wherein the attachment ends of the first and second pedestals are formed with a flange embedded in said base portion.

15. A plastic skate molded as a single, homogenous, integrally molded piece comprising:

a boot portion for receiving a skater's foot having a molded outer shell including a toe portion, a heel portion spaced from said toe portion, first and second opposed sidewall portions extending longitudinally from said toe to said heel portion, and a base portion extending between said sidewall portions and said heel and toe portions, said base portion including a bottom side and a top side surface which forms the bottom foot support for said skater's foot and which with said heel, toe and sidewall portions defines a cavity within said molded outer shell for receiving a skater's foot which is supported and enclosed thereby, said outer shell including a heel slit formed in the heel portion thereof and spaced above said base portion, said heel slit having a first end positioned in said first sidewall portion and extending through said outer shell from said first sidewall portion across said heel portion to a second end positioned in said second sidewall portion, and a boot upper extending above said heel slit, said boot upper including first and second opposed flaps extending above said first and second opposed sidewall portions, each said flap including a bottom edge defined by an inclined slit extending through said outer shell, each said inclined slit angling downwardly and rearwardly of said outer shell from an open end toward the first or second end of said heel slit, and a support structure molded integrally with said base portion and extending from the bottom side of said base portion, said boot portion and support structure being formed as a unitary piece with no junctures therebetween.

16. The plastic skate of claim 15 wherein each said inclined slit is triangular in configuration and terminates at an apex spaced from a first or second end of said heel slit to form a fulcrum area therebetween.

17. The plastic skate of claim 15 wherein the open end of said inclined slits is wider than the width of said heel slit.

18. The plastic skate of claim 16 wherein the cross sectional area of said fulcrum section decreases progressively from the first and second ends of said heel slit to the apices of said inclined slits.

19. A molded plastic boot for receiving the foot of a wearer comprising:

a molded outer shell including a toe portion, a heel portion spaced from the toe portion, first and second opposed sidewall portions extending longitudinally from said toe to heel portion, and a sole portion extending between said sidewall portions and said heel and toe portions to define a cavity within said molded outer shell for receiving a wearer's foot which is supported and enclosed thereby, said molded outer shell including a heel slit formed in the heel portion thereof and spaced above said base portion, said heel slit having a first end positioned in said first sidewall portion and extending through said boot from said first sidewall portion across said heel portion to a second end positioned in said second sidewall portion, and a boot upper extending above said first slit, said boot upper including first and second opposed flaps extending above said first and second opposed sidewall portions, each said flap including a bottom edge defined by an inclined slit extending through said boot, each said inclined slit angling downwardly and rearwardly of said boot from an open end toward the first or second end of said heel slit.

20. The molded plastic boot of claim 19 wherein each said inclined slit is triangular in configuration and terminates at an apex spaced from a first or second end of said heel slit to form a fulcrum area therebetween.

21. The molded plastic boot of claim 19 wherein the open end of said inclined slits is wider than the width of said heel slit.

22. The molded plastic boot of claim 20 wherein the cross sectional area of said fulcrum section decreases progressively from the first and second ends of said heel slit to the apices of said inclined slits.

23. A method for injection molding an integrally molded skate boot and support chassis for a skate blade or wheels comprising the steps of:

molding the support chassis of a first thermoplastic plastic to include plastic attachment pedestals for connection to a boot, placing the molded support chassis in a boot forming injection mold with only the support pedestals exposed to plastic injected within the boot forming injection mold, and injecting a second heated thermoplastic plastic which differs from said first thermoplastic plastic into the boot forming injection mold into contact with said pedestals to form a plastic boot shell, said first and second thermoplastic plastics being compatible thermoplastics so that the plastic of said pedestals flows into the second thermoplastic plastic of said boot shell at the temperature at which said second thermoplastic plastic is injected into the boot forming mold.

24. The method of claim 23 wherein said first thermoplastic plastic, when cooled, is more rigid and less flexible than said second thermoplastic plastic when cooled.

25. The method of claim 23 wherein said first thermoplastic and second plastics are different varieties of the same plastic.

26. The method of claim 24 wherein said first thermoplastic and second plastics are polypropylene elastomers.

27. The method of claim 24 wherein said first and second thermoplastic plastics are thermoplastic urethanes.

* * * * *